United States Patent [19]
Dominianni

[11] 3,715,362
[45] Feb. 6, 1973

[54] TETRACYCLIC AZIRIDINE AND METHOD FOR ITS PREPARATION

[75] Inventor: Samuel J. Dominianni, Indianapolis, Ind.

[73] Assignee: Eli Lilly and Company, Indianapolis, Ind.

[22] Filed: Aug. 17, 1970

[21] Appl. No.: 64,569

[52] U.S. Cl............................260/293.54, 260/647
[51] Int. Cl. ...............................C07d 39/00
[58] Field of Search..................260/293.54

[56] References Cited

OTHER PUBLICATIONS

Martin et al., J. Org. Chem. 33, 3428–3434 (1968).
Closs et al., J. Am. Chem. Soc. 82, 6068–6070 (1960).
Gaylord, "Reduction With Complex Metal Hydrides," Interscience, New York (1956), pp. 95 and 97.

Primary Examiner—Henry R. Jiles
Assistant Examiner—G. Thomas Todd
Attorney—Everet F. Smith and James L. Rowe

[57] ABSTRACT

A novel tetracyclic aziridine and a method for its preparation are provided.

2 Claims, No Drawings

TETRACYCLIC AZIRIDINE AND METHOD FOR ITS PREPARATION

BACKGROUND OF THE INVENTION

Exo-cis-1a,2,7,7a-tetrahydro-1-(p-tosyl)-1H-2,7-methano[2,3-b]aziridinonaphthalene has been prepared by the action of p-tosylazide on exo-1,4-dihydro-1,4-methanonaphthalene. (Martin and Coster, J. Org. Chem. 33, 3428 (1968))

SUMMARY

This invention provides exo-cis-1a,2,7,7a-tetrahydro-1H-2,7-methano[2,3-b]aziridinonaphthalene represented by the formula

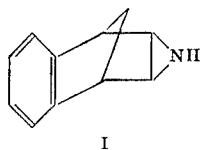

I

The compound is prepared according to the following reaction scheme:

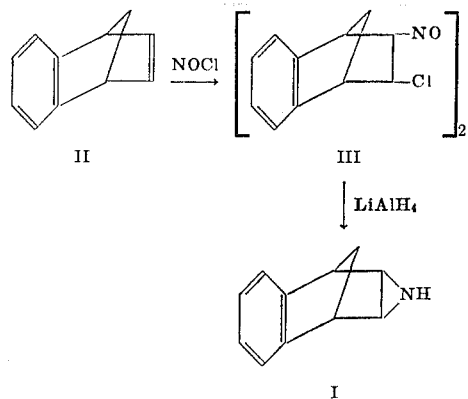

In the above reaction scheme, exo-1,4-dihydro-1,4-methanonaphthalene (II) is reacted with nitrosyl chloride to yield the dimer of 2-chloro-3-nitroso-exo-1,2,3,4-tetrahydro-1,4-methanonaphthalene (III). Reduction of the latter compound with lithium aluminum hydride yields exo-cis-1a,2,7,7a-tetrahydro-1H-2,7-methano[2,3-b]aziridinonaphthalene as an oil. While the aziridine compound can be stored at low temperatures, it is unstable at room temperature and cannot be distilled, and should be employed synthetically as soon as possible.

Exo-cis-1a,2,7,7a-tetrahydro-1H-2,7-methano[2,3-b]-aziridinonaphthalene is an alkylating agent and can be used to prepare derivatives of hydroxy or sulfhydryl containing substances, as is the case with other aziridines. Thus, the compound finds its chief utility as an intermediate in the preparation of other useful substances or in the treatment of diseases in which alkylating agents are known to be useful. As an example of the use of the compound as an intermediate, it can be reacted with p-tosyl chloride to yield both exo-cis-1a,2,7,7a-tetrahydro-1-(p-tosyl)-1H-2,7-methano[2,3-b]aziridinonaphthalene and endo-1,2,3,4-tetrahydro-2-p-tosylamido(1,4-methanonaphthalene), central nervous system depressants.

EXAMPLE I 2.84 g. of exo-1,4-dihydro-1,4-methanonaphthalene were dissolved in 30 ml. of chloroform to which was added 15–20 ml. of nitrosyl chloride. The reaction mixture was kept at about 0°C. for 30 minutes after which time about 30 ml. of methanol were added. The product of the reaction was the insoluble dimer of 2-chloro-3-nitroso-exo-1,2,3,4-tetrahydro-1,4-methanonaphthalene, melting at about 167°–169°C. with decomposition. A mixture of 2.07 g. of the dimer, 50 ml. of dioxan and 3.8 g. of lithium aluminum hydride was cautiously heated to about 75°C. at which temperature a vigorous reaction set in. After the initial reaction subsided, the reaction mixture was heated at 75°C. for an additional hour, then stirred overnight at ambient temperatures. Excess lithium aluminum hydride was decomposed by the addition of water and 20 percent aqueous sodium hydroxide, according to standard procedures. The reaction mixture was filtered to remove lithium salts. The filtrate was evaporated in vacuo to an oily residue consisting of exo-cis-1a,2,7,7a-tetrahydro-1H-2,7-methano[2,3-b]aziridinonaphthalene. The compound was very reactive and started to turn brown immediately on standing at room temperature.

The compound was dissolved in ether and treated at 0°C. with p-tosyl chloride containing a catalytic quantity of pyridine in order to prepare a stable derivative which could be characterized. A mixture containing three tosyl amides was obtained and the amides were separated by fractional crystallization from isopropanol. The least-soluble product was exo-cis-1a,2,7,7a-tetrahydro-1-(p-tosyl)-1H-2,7-methano[2,3-b]aziridinonaphthalene melting at about 153°–155°C., the tosyl amide of the parent aziridine (I). Two other amides isolated from the reaction mixture were endo-1,2,3,4-tetrahydro-2-(p-tosylamido)-1,4-methanonaphthalene melting at about 142°–144°C. and exo-1,2,3,4-tetrahydro-2-(p-tosylamido)-1,4-methanonaphthalene melting at about 123°–125°C. The two amides resulted from the opening of the aziridine ring during the reaction with p-tosyl chloride, but constituted only about 35 percent of the reaction product, the tosyl amide of the intact aziridine being the major reaction product.

All structural assignments were based upon nmr spectral data.

I claim:

1. Exo-cis-1a,2,7,7a-tetrahydro-1H-2,7-methano[2,3-b]aziridinonaphthalene represented by the formula

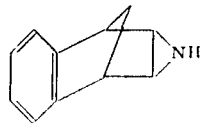

2. The process which comprises reacting exo-1,4-dihydro-1,4-methanonaphthalene with nitrosyl chloride, thus forming the dimer of 2-chloro-3-nitroso-exo-1,2,3,4-tetrahydro-1,4-methanonaphthalene and then reducing said dimer with lithium aluminum hydride to yield exo-cis-1a,2,7,7a-tetrahydro-1H-2,7-methano[2,3-b]aziridinonaphthalene.

* * * * *